United States Patent
Hanyu (10) Patent No.: US 8,798,955 B2
(45) Date of Patent: Aug. 5, 2014

(54) ACOUSTIC ENERGY MEASUREMENT DEVICE, AND ACOUSTIC PERFORMANCE EVALUATION DEVICE AND ACOUSTIC INFORMATION MEASUREMENT DEVICE USING THE SAME

(75) Inventor: Toshiki Hanyu, Tokyo (JP)

(73) Assignee: Nihon University, Tokyo (JP)

( * ) Notice: Subject to any disclaimer, the term of this patent is extended or adjusted under 35 U.S.C. 154(b) by 119 days.

(21) Appl. No.: 13/000,350

(22) PCT Filed: Jun. 19, 2009

(86) PCT No.: PCT/JP2009/002793
§ 371 (c)(1),
(2), (4) Date: Dec. 20, 2010

(87) PCT Pub. No.: WO2009/153999
PCT Pub. Date: Dec. 23, 2009

(65) Prior Publication Data
US 2011/0106486 A1    May 5, 2011

(30) Foreign Application Priority Data
Jun. 20, 2008    (JP) ................ 2008-161182

(51) Int. Cl.
*H04R 3/00* (2006.01)
*G01H 3/12* (2006.01)
*H04R 1/40* (2006.01)
*H04R 29/00* (2006.01)
*H04R 1/32* (2006.01)

(52) U.S. Cl.
CPC ............... *G01H 3/12* (2013.01); *H04R 29/004* (2013.01); *H04R 1/406* (2013.01); *H04R 3/005* (2013.01); *H04R 1/326* (2013.01); *H04R 29/005* (2013.01)
USPC ........................................ 702/138

(58) Field of Classification Search
USPC ....................................... 702/138
See application file for complete search history.

(56) References Cited

U.S. PATENT DOCUMENTS 6,600,824 B1    7/2003    Matsuo
7,672,196 B1    3/2010    Hanyu
(Continued)

FOREIGN PATENT DOCUMENTS

EP    1813956 A1 *    8/2007
JP    63-295932 A    12/1988
(Continued)

OTHER PUBLICATIONS

Nehorai, Arye, Acoustic Vector-Sensor Array Processing, IEEE Transactions on Signal Processing, vol. 42, No. 9, Sep. 1994.*
(Continued)

*Primary Examiner* — John Breene
*Assistant Examiner* — Timothy H Hwang
(74) *Attorney, Agent, or Firm* — Wells St. John P.S.

(57) ABSTRACT

An acoustic energy measurement device that measures acoustic energy, the acoustic energy measurement device has a sound receiving unit that performs sound/electricity conversion and includes a plurality of unidirectional microphones being so disposed that a sum total of unit vectors facing a maximum sensitivity direction thereof becomes zero. The acoustic energy measurement device further includes a sound pressure calculation unit that calculates sound pressure using an output from the sound receiving unit. Still further, the acoustic energy measurement device has a particle velocity calculation unit that calculates particle velocity using an output from the sound receiving unit. Still further, the acoustic energy measurement device has an acoustic energy calculation unit that calculates acoustic energy using outputs from the sound pressure calculation unit and the particle velocity calculation unit.

8 Claims, 9 Drawing Sheets

(56) References Cited

U.S. PATENT DOCUMENTS

| | | |
|---|---|---|
| 2005/0182627 A1 | 8/2005 | Tanaka et al. |
| 2006/0029233 A1* | 2/2006 | Sommerfeldt et al. ...... 381/71.7 |
| 2011/0103601 A1 | 5/2011 | Hanyu |

FOREIGN PATENT DOCUMENTS

| | | |
|---|---|---|
| JP | 2-36318 | 6/1990 |
| JP | 06-194217 | 7/1994 |
| JP | 6-201450 A | 7/1994 |
| JP | 10-097263 | 4/1998 |
| JP | 2000-261900 | 9/2000 |
| JP | 2001-045590 | 2/2001 |
| JP | 2007-054909 | 3/2007 |
| JP | 2007-292667 | 11/2007 |
| JP | 2008-057260 | 3/2008 |
| JP | 2008-249702 | 10/2008 |
| WO | 2006/054599 A1 | 5/2006 |
| WO | WO2009110239 | 9/2009 |

OTHER PUBLICATIONS

Nutter David B., Leishman Timothy W., Somemrfeldt Scott D., Blotter Jonathan D., "Measurment of sound power and absorption in reverberation chambers using energy density", J Acoust Soc Am, 2007.05, vol. 121, No. 5, p. 2700-2710.

"Sanjigen Onkyo Intensity Probe", Shun Oguro, Shozo Anzai, Hideo Suzuki, IEICE Technical Report, Aug. 25, 1992, vol. 92, No. 191 (EA9247-55), pp. 59-62.

* cited by examiner

MEASUREMENT RESULT AT 5 POINTS
(REVERBERATION ATTENUATION CURVE: 63Hz OCTAVE BAND)

ACOUSTIC ENERGY MEASUREMENT DEVICE, AND ACOUSTIC PERFORMANCE EVALUATION DEVICE AND ACOUSTIC INFORMATION MEASUREMENT DEVICE USING THE SAME

CROSS REFERENCE TO RELATED APPLICATION

This is a 35 U.S.C. §371 application of, and claims priority to, International Application No. PCT/JP2009/002793, which was filed on Jun. 19, 2009, and which claims priority to Japanese Patent Application No. 2008-161182, which was filed on Jun. 20, 2008, and the teachings of all the applications are incorporated herein by reference.

TECHNICAL FIELD

The present invention relates to an acoustic energy measurement device, and more particularly to an acoustic energy measurement device which can measure acoustic energy without being affected by effects of a standing wave. The present invention also relates to an acoustic performance evaluation device that evaluates spatial acoustic performance using such an acoustic energy measurement device. Furthermore, the present invention relates to an acoustic information measurement device that can measure not only acoustic energy but also acoustic information such as sound pressure, particle velocity and acoustic intensity.

BACKGROUND ART

A sound level meter that uses a microphone of a sound pressure type has been used in evaluating acoustic performance in an enclosed space such as a room of a building, vehicle or airplane.

However, when sound pressure measurement takes place in the enclosed space, the presence of a standing wave significantly affects the sound pressure measured. In this case, the standing wave refers to characteristic vibrations that occur in such cases as when the dimensions of the enclosed space match the wavelength. When the standing wave occurs in the enclosed space, the following phenomenon could occur: Large sound pressure is measured at a given measurement location, while small sound pressure is measured at another measurement location.

Thus, the problem is that when acoustic performance is evaluated in an enclosed space such as a room of a building, it is impossible to accurately evaluate acoustic performance, such as performance of sound insulation of the space, by measuring sound pressure only at one point due to the effects of the standing wave. To address such a problem, what is defined in JIS or ISO is to measure sound pressure at a plurality of points in the space and to average the measured values in a bid to improve the accuracy of acoustic performance evaluation. For example, what is disclosed in Patent Document 1 is a housing acoustic performance measurement device that adopts such an ISO standard.

Those disclosed in Patent Documents 2 and 3 are used as a technique of correcting a sound field with a standing wave being taken into account. The technique disclosed in Patent Document 2 is designed to measure a standing wave in a trunk room when a car audio system outputs sound in a vehicle, cancel the standing wave with the output of a separately provided speaker to eliminate the standing wave in the trunk room, and therefore output good-quality sound in the vehicle. Similarly, the technique disclosed in Patent Document 3 is designed to measure a standing wave, cancel the standing wave at a given location with the output of a speaker and stabilize a sound pressure level.

CITATION LIST

Patent Documents

Patent Document 1: Japanese Patent Application Kokai Publication No. Hei 6-194217
Patent Document 2: Japanese Patent Application Kokai Publication No. Hei 10-97263
Patent Document 3: Japanese Patent Application Kokai Publication No. 2000-261900

DISCLOSURE OF THE INVENTION

Problems to be Solved by the Invention

However, even if sound pressure is measured at a plurality of points and the measured values are averaged in a similar way to that disclosed in Patent Document 1 where an ISO or JIS standard is used, sound pressure varies greatly at different locations, particularly in a low frequency region, because of the effects of the standing wave; the problem is that with the average of measured values at a limited number of points, it is impossible to evaluate appropriately. Moreover, with the use of the characteristic of the sound pressure that varies greatly according to measurement locations, measurement may take place so that a low value (small noise) is intentionally generated; it has been also pointed out that it is difficult to ensure the objectivity of the acoustic performance evaluation.

According to the techniques disclosed in Patent Documents 2 and 3, sound pressure is measured to control the distribution of sound pressure strength associated with the standing wave with the use of the output of the speaker so that the distribution is kept constant. However, the measured sound pressure cannot be used in evaluating the acoustic performance of the enclosed space (which is, more specifically, performance of sound insulation).

In view of such circumstances, the present invention is aimed at providing an acoustic energy measurement device which can measure acoustic energy without being affected by the effects of a standing wave even in an enclosed space where the standing wave could occur by taking into account not only sound pressure but also particle velocity. The present invention is also aimed at providing an acoustic performance evaluation device which can objectively evaluate acoustic performance without being affected by the effects of a standing wave with the use of the above acoustic energy measurement device. Furthermore, the present invention is aimed at providing an acoustic information measurement device which can measure not only acoustic energy but also acoustic information such as sound pressure, particle velocity and acoustic intensity.

Means for Solving the Problems

To achieve the above objects of the present invention, according to an aspect of the present invention, there is provided an acoustic energy measurement device including a sound receiving unit that performs sound/electricity conversion; a sound pressure calculation unit that calculates sound pressure using an output from the sound receiving unit; and an acoustic energy calculation unit that calculates acoustic energy using an output from the sound pressure calculation unit.

Moreover, the acoustic energy measurement device may include a particle velocity calculation unit that calculates particle velocity using an output from the sound receiving unit, wherein the acoustic energy calculation unit calculates acoustic energy using outputs from the sound pressure calculation unit and the particle velocity calculation unit.

The acoustic energy calculation unit may calculate acoustic energy by adding together potential energy that is calculated with the use of an output from the sound pressure calculation unit and kinetic energy that is calculated with the use of an output from the particle velocity calculation unit.

The sound receiving unit may include a plurality of unidirectional microphones, and a plurality of the microphones may be so disposed that the sum total of unit vectors facing a maximum sensitivity direction thereof becomes zero.

The sound receiving unit may include a characteristic correction unit that corrects a characteristic of information measured by the sound receiving unit.

An acoustic performance evaluation device may produce an acoustic evaluation indicator on the basis of acoustic energy measured by the acoustic energy measurement device according to the present invention.

An acoustic information measurement device that uses the acoustic energy measurement device according to the present invention may include an acoustic intensity calculation unit that calculates acoustic intensity using at least an output from the sound pressure calculation unit.

The acoustic information measurement device may include switching unit for switching between at least two or more of the items including the sound pressure by the sound pressure calculation unit, the particle velocity by the particle velocity calculation unit, the acoustic energy by the acoustic energy calculation unit and the acoustic intensity by the acoustic intensity calculation unit, as an output of the acoustic information measurement device.

Advantages of the Invention

An advantage of the acoustic energy measurement device of the present invention is to be able to measure acoustic energy without being affected by the effects of a standing wave. Moreover, an advantage of the acoustic performance evaluation device of the present invention is to be able to objectively evaluate acoustic performance without being affected by the effects of a standing wave. Furthermore, an advantage of the acoustic information measurement device of the present invention is to be able to measure not only acoustic energy but also acoustic information such as sound pressure, particle velocity and acoustic intensity.

BEST MODE FOR CARRYING OUT THE INVENTION

Figure 1:
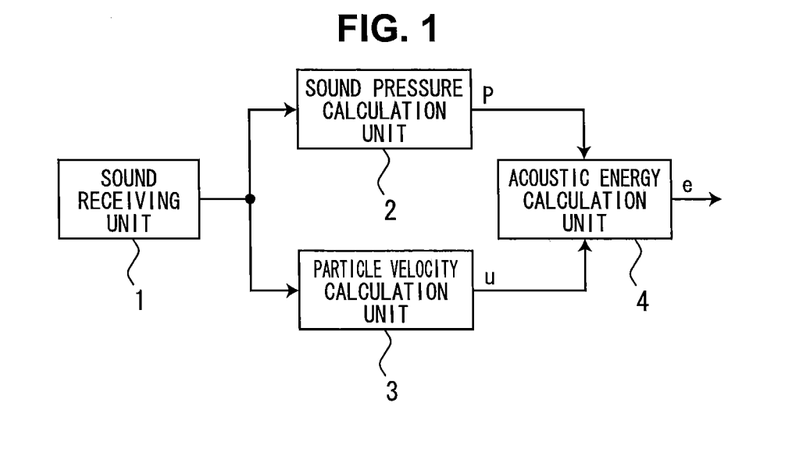
FIG. 1 is a block diagram illustrating an acoustic energy measurement device of the present invention.

Hereinafter, the best mode for carrying out the invention, as well as examples illustrated in the accompanying diagrams, will be described. FIG. 1 is a block diagram illustrating an acoustic energy measurement device of the present invention. As shown in the diagram, the acoustic energy measurement device of the present invention mainly includes a sound receiving unit 1, a sound pressure calculation unit 2, a particle velocity calculation unit 3, and an acoustic energy calculation unit 4.

The sound receiving unit 1 is designed to perform sound/electricity conversion and includes microphones. The configuration and system of the microphone is not limited to a specific one. As described later, any microphones are available as long as it is possible for the microphones to obtain information from which sound pressure and particle velocity can be calculated.

The sound pressure calculation unit 2 is designed to calculate sound pressure using an output from the sound receiving unit 1. The sound receiving unit 1 outputs a signal (such as voltage) that varies according to the loudness of sound measured by the microphone. Using the signal, the sound pressure calculation unit 2 calculates sound pressure P. For such a calculation process, a computer, DSP (Digital Signal Processor) or the like may be used.

The particle velocity calculation unit 3 is designed to calculate particle velocity using an output from the sound receiving unit 1. As in the case of the sound pressure calculation unit 2, particle velocity u is calculated with the use of an output signal, such as voltage, from the sound receiving unit 1. For such a calculation process, a computer, DSP or the like may also be used.

In the example illustrated in the diagram, the particle velocity calculation unit 3 is clearly shown. However, as described below, if it is possible to calculate acoustic energy using only information from the sound pressure calculation unit without directly calculating particle velocity, it is not necessary even to calculate particle velocity. Therefore, in this case, it is not necessary for the particle velocity calculation unit to be provided.

The acoustic energy calculation unit 4 is designed to calculate acoustic energy using the outputs from the sound pressure calculation unit 2 and the particle velocity calculation unit 3. With the use of the sound pressure calculated by the sound pressure calculation unit 2 and the particle velocity calculated by the particle velocity calculation unit 3, an addition process of the sound pressure and the particle velocity is performed to calculate acoustic energy e. For such a calculation process, a computer, DSP or the like may be used.

Computers, DSPs or the like for calculating sound pressure, particle velocity and acoustic energy may be constituted by common ones. Additionally, such calculation processing units may be realized by programs that work on an electronic calculator such as computer.

It is possible that in the acoustic energy measurement device of the present invention, using a characteristic of information measured by the sound receiving unit without changing the characteristic, a sound pressure calculation process, particle velocity calculation process or acoustic energy calculation process is performed. However, for example, the following is also possible: with a characteristic correction unit provided in the sound receiving unit to correct the characteristic, each of the calculation processes is performed after various corrections (weighting or filtering) are made by the characteristic correction unit. For example, since the sensitivity of human ear varies relative to a frequency of sound, various weighting characteristics, including the following, are known: A-weighting, which is for approximating a noise level (sensory quantity), and C-weighting, which is for approximating a sound pressure level (physical quantity). Therefore, with the sound receiving unit of the acoustic energy measurement device of the present invention that makes similar corrections, it is possible to calculate acoustic energy or the like to which desired corrections have been made.

Here, the configuration of the sound receiving unit, sound pressure calculation unit and particle velocity calculation unit in the acoustic energy measurement device of the present invention will be described particularly. For the acoustic energy measurement device of the present invention, any kind of configuration can be applied as long as the configuration enables sound pressure and particle velocity to be calculated. For example, there is a sound pressure calculation unit that is known to quantify the magnitude of a change of sound wave pressure measured by a sound receiving unit that adopts a non-directional microphone. The particle velocity calculation unit may be designed to calculate particle velocity based on a difference in sound pressure measured by a sound receiving unit that employs a plurality of non-directional microphones disposed on the same straight line (P-P type) (which is for example the one disclosed in Japanese Patent Application Kokai Publication No. 2001-045590; such a configuration is hereinafter referred to as Example 1).

The particle velocity calculation unit may be designed to use, for example, two hot wires as a sound receiving unit and to calculate particle velocity using changes in the resistance values of the hot wires as airborne particles pass through (which is for example the one disclosed in Japanese Patent Application Kokai Publication No. 2007-292667; such a configuration is hereinafter referred to as Example 2).

For example, using a plurality of unidirectional microphones, the inventor of the present application is developing various measurement devices of a type (C-C type) that measures acoustic information from directional information of the unidirectional microphones. Such a C-C type measurement device may be applied to the acoustic energy measurement device of the present invention. For example, what is disclosed in the International Publication No. 2006/054599 pamphlet is a device that enables sound pressure or particle velocity to be calculated with the use of a level-difference database of microphones that are disposed at 180 degrees in opposite directions. Moreover, according to Japanese Patent Application No. 2007-054909 (which corresponds to Japanese Patent Application Kokai Publication No. 2008-249702), the development of an acoustic measurement device of a C-C type is under way that detects, without using a database or the like, sound pressure or particle velocity by performing a predetermined calculation process with the use of a sound receiving unit that is constituted by a pair of unidirectional microphones disposed at 180 degrees in opposite directions in terms of directivity on each axis of Cartesian coordinates. In such C-C type acoustic measurement devices, there is no frequency dependence of sound from a sound source and it is possible to measure sound pressure and particle velocity (Such a configuration is hereinafter referred to as Example 3).

In Example 3, the sound receiving unit of a C-C type includes a plurality of unidirectional microphones; each of the microphones is disposed so that the sum total of unit vectors facing a maximum sensitivity direction thereof becomes zero.

Figure 2:
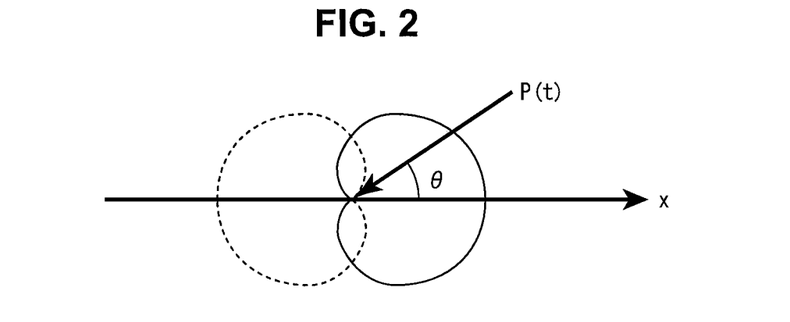
FIG. 2 is a conceptual diagram for the case in which a sound field is assumed where a single plane wave reaches a sound receiving unit.

The following describes a concept of the sound receiving unit, sound pressure calculation unit and the particle velocity calculation unit of a C-C type. FIG. 2 is a conceptual diagram for the case in which a sound field is assumed where a single plane wave reaches the sound receiving unit. FIG. 2 shows directional characteristics when, in the sound receiving unit, two unidirectional microphones form a pair and when the directions of maximum sensitivity direction thereof are set with one facing the positive side of the x-axis direction and the other facing the negative side. When a sound field is assumed where a single plane wave P(t) arrives at angle θ relative to the x-direction as shown in the diagram, particle velocity u(t) of a sound field traveling direction is represented by the following formula:

$$u(t)=P(t)/\rho c \qquad \text{[Formula 1]}$$

where ρ is air density; c is sound velocity; and ρc is acoustic impedance.

Particle velocity $u_x(t)$ of the x-direction is represented by the following formula:

$$u_x(t)=-\{P(t)\cos\theta\}/\rho c \qquad \text{[Formula 2]}$$

Next, the sound field is measured by the sound receiving unit constituted by a pair of unidirectional microphones. It is possible to list various types of the unidirectional microphone, for example, including cardioid microphones, super-cardioid microphones and hyper-cardioid microphones. For example, when cardioid microphones are used, responses $P_1(t)$ and $P_2(t)$ measured by two microphones are represented by the following formulas:

$$P_1(t)=P(t)(0.5+0.5\cos\theta) \qquad \text{[Formula 3]}$$

$$P_2(t)=P(t)(0.5-0.5\cos\theta) \qquad \text{[Formula 4]}$$

Adding $P_1(t)$ and $P_2(t)$ gives a non-directional response as shown in the following formula:

$$P_1(t)+P_2(t)=P(t) \qquad \text{[Formula 5]}$$

The sound pressure calculation unit calculates sound pressure by adding the measured values of the two microphones as described above. Additionally, it is clear from the above formula that adding the measured values of the microphones gives non-directional sound pressure; such configuration, therefore, enables non-directional sound pressure to be easily calculated.

The following describes the particle velocity calculation unit. First, the difference between the above $P_1(t)$ and $P_2(t)$ is represented by the following formula:

$$P_1(t)-P_2(t)=P(t)\cos\theta \qquad \text{[Formula 6]}$$

When Formulas 6 and 2 are used, it is possible to calculate the x-direction particle velocity $u_x(t)$ from the difference in response between the two microphones as indicated in the following formula:

$$u_x(t) = -\{P_1(t) - P_2(t)\}/\rho c \quad \text{[Formula 7]}$$

Accordingly, the particle velocity calculation unit calculates a particle velocity component by calculating the difference in response between the two microphones as described above. Even when particle velocity components of the y- and z-directions are calculated, a particle velocity component of each direction may be calculated similarly in accordance with the above theory; it is possible to calculate particle velocity u(t) by combining vectors of particle velocity components of the above directions.

Additionally, in the above-described case, a sound field is assumed where a single plane wave reaches a sound receiving unit. However, the present invention is not limited to this. It is possible to calculate particle velocity in accordance with a similar theory even for interference sound fields or near sound fields.

It is obvious from the above that in the acoustic energy measurement device of the present invention, for the sound receiving unit, the sound pressure calculation unit and the particle velocity calculation unit of a C-C type, such as those shown in Example 3, it is possible to calculate particle velocity and non-directional sound pressure of each dimension by the difference and the addition of a pair of microphones in each dimension.

In the acoustic energy measurement device of the present invention, the sound receiving unit, the sound pressure calculation unit and the particle velocity calculation unit may interpret C-C type using vectors to calculate sound pressure and particle velocity. Additionally, the method of combining C-C vectors is disclosed in detail in Japanese Patent Application No. 2008-057260 (which corresponds to International Publication No. WO2009/110239) filed by the inventor of the present application (Such a configuration is hereinafter referred to as Example 4).

When a sound field is assumed where a single plane wave P(t) arrives, non-directional sound pressure P(t) and particle velocity vector u(t) are represented by the following formulas:

$$P(t) = \frac{2}{n} \sum_{i=1}^{n} P_i(t) \quad \text{[Formula 8]}$$

$$\vec{u}(t) = -\frac{K}{\rho c} \sum_{i=1}^{n} \{P_i(t) \cdot \vec{e}_i\} \quad \text{[Formula 9]}$$

where, in the above formulas, n represents the number of microphones (the number of channels), $P_i(t)$ is the unidirectional sound pressure obtained by an i-channel microphone, K is a coefficient for particle velocity normalization which varies according to the number of channels or the type of microphones, and vector $e_i$ is a unit vector that faces the maximum sensitivity direction of the i-channel microphone.

In Example 4, it is clear from the above formulas that if the sound field is interpreted as vectors, the particle velocity vector is represented as a combination of vectors after each unit vector is multiplied (weighted) by the value measured by each of a plurality of unidirectional microphones. That is, in the particle velocity calculation unit, each unit vector may be multiplied by the sound pressure of each of a plurality of unidirectional microphones and then the results may be combined.

Non-directional sound pressure is represented as the sum total of sound pressure of a plurality of unidirectional microphones. That is, in the sound pressure calculation unit, the sum total of sound pressure of a plurality of unidirectional microphones is calculated.

Here, as for a plurality of microphones of the sound receiving unit of a C-C vector combination method of Example 4, the following conditions (1) to (3) are added for the unit vector that faces the maximum sensitivity direction thereof.

(1) The condition that as shown in the following formula, the unit vector that faces the maximum sensitivity direction of each microphone is spatially balanced, i.e., a plurality of microphones is so disposed that the total sum of the unit vectors becomes zero.

$$\sum_{i=1}^{n} \vec{e}_i = 0 \quad \text{[Formula 10]}$$

(2) The condition that as shown in the following formula, each dimension makes an equal contribution, i.e., a plurality of microphones is so disposed that each the sum total of the squares of each component of each unit vector of each of a plurality of the microphones is equal.

$$\sum_{i=1}^{n} x_i^2 = \sum_{i=1}^{n} y_i^2 = \sum_{i=1}^{n} z_i^2 \quad \text{[Formula 11]}$$

(3) The condition that the number of microphones is greater than the number of space dimensions of vectors of the acoustic information to be calculated.

In that manner, in the acoustic energy measurement device that adopts the C-C vector combination method of Example 4, all that is required is that a plurality of microphones constituting the sound receiving unit satisfies the above conditions. However, the condition (2) is not necessarily essential; even when the microphones are disposed in such a way that each dimension does not make an equal contribution, it is possible to handle by making appropriate corrections as long as the condition (1) is satisfied.

As long as a plurality of the microphones satisfies the above conditions, it is possible for the sound receiving unit of the acoustic energy measurement device of the present invention to employ the vector combination method.

Figure 3:
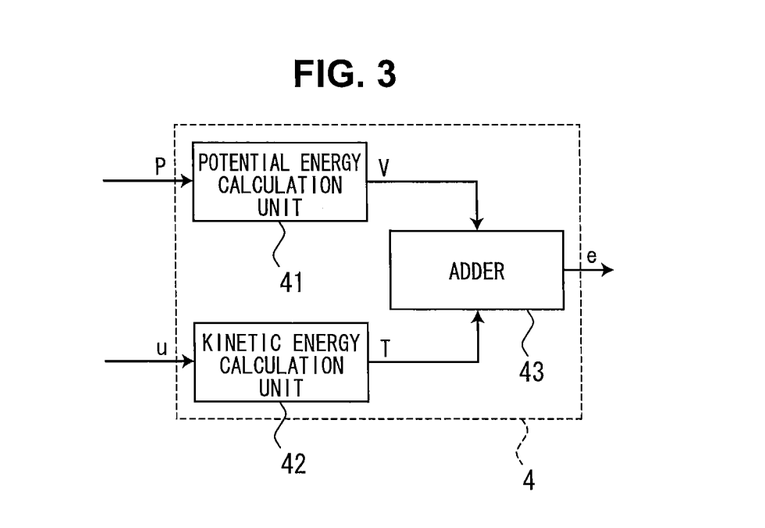
FIG. 3 is a block diagram illustrating an acoustic energy calculation unit of the acoustic energy measurement device of the present invention.

The acoustic energy measurement device of the present invention calculates acoustic energy, using the sound pressure and the particle velocity thus calculated. The following describes the specific configuration of the acoustic energy calculation unit with reference to FIG. 3. FIG. 3 is a block diagram illustrating the acoustic energy calculation unit of the acoustic energy measurement device of the present invention. As shown in the diagram, the acoustic energy calculation unit 4 of the acoustic energy measurement device of the present invention includes a potential energy calculation unit 41, a kinetic energy calculation unit 42, and an adder 43.

The potential energy calculation unit 41 is designed to calculate potential energy V using the sound pressure P output from the sound pressure calculation unit 2 to calculate potential energy V. The potential energy V is represented by the following formula:

$$V = \frac{1}{2}P^2(t)/\rho c^2 \quad \text{[Formula 12]}$$

The kinetic energy calculation unit 42 is designed to calculate kinetic energy using the particle velocity u output from the particle velocity calculation unit 3. The kinetic energy T is represented by the following formula:

$$T = \frac{1}{2}\rho u^2(t) \quad \text{[Formula 13]}$$

Additionally, the particle velocity u represents vector quantity. However, in the kinetic energy calculation unit 42, only the magnitude of the particle velocity is used as scalar quantity.

Adding the potential energy V and the kinetic energy T gives acoustic energy e. That is, with the use of Formulas 12 and 13, the acoustic energy e is represented by the following formula:

$$e = V + T \quad \text{[Formula 14]}$$
$$= \frac{1}{2}P^2(t)/\rho c^2 + \frac{1}{2}\rho u^2(t)$$

Accordingly, it is obvious even from Formula 14 that in order to calculate the acoustic energy, all that is required is to add the potential energy, which is calculated with the use of the output from the sound pressure calculation unit, and the kinetic energy, which is calculated with the use of the output from the particle velocity calculation unit.

Additionally, in Formula 14, the acoustic energy is made by adding the potential energy and the kinetic energy. However, for an acoustic energy calculation process, the present invention is not limited to this; by transforming formulas appropriately or doing other processes, a formula may be used in which the potential energy and the kinetic energy are not necessarily added. Furthermore, as for the particle velocity, if Formula 7 or 9 is used, the kinetic energy of Formula 13 can be represented only by unidirectional sound pressure. Accordingly, by transforming formulas appropriately and doing other processes, without directly calculating the particle velocity, the sound pressure calculation unit is designed to output unidirectional sound pressure in accordance with the number of channels of a microphone; when calculation takes place to calculate acoustic energy with the use of the unidirectional sound pressure, it is not necessary even to calculate the particle velocity. Thus, in this case, it is not necessary for the particle velocity calculation unit to be provided.

Here, the characteristics of acoustic energy when a standing wave occurs in an enclosed space will be described. When a standing wave occurs, the sound pressure and the particle velocity have a phase-shift relationship. For example, the following describes the case in which there is a phase shift of 90 degrees. When the square of the sound pressure is a maximum value, the square of the particle velocity is a minimum value. Conversely, when the square of the sound pressure is a minimum value, the square of the particle velocity is a maximum value. Meanwhile, it is clear from Formulas 12 and 13 that the potential energy and the kinetic energy are proportional to the square of the sound pressure and to the square of the particle velocity, respectively. Accordingly, as for the relationship between the potential energy and the kinetic energy, when the potential energy is a maximum value, the kinetic energy is a minimum value. Conversely, when the potential energy is a minimum value, the kinetic energy is a maximum value. That is, even though the kinetic energy and the potential energy change due to the effects of the standing wave, the value of acoustic energy calculated by adding both remains stable since the change means that energy is transferred therebetween. Therefore, the acoustic energy is a value not affected by the presence of the standing wave.

According to a conventional measurement method by which only sound pressure is measured, in an enclosed space where a standing wave occurs, the measured value varies widely according to where the measurement takes place due to the effects of the standing wave. However, according to the acoustic energy measurement device of the present invention, it is possible to measure acoustic energy without being affected by the effects of the standing wave; it is possible to obtain the measured value that is not dependent on the measurement location.

Figure 4A:
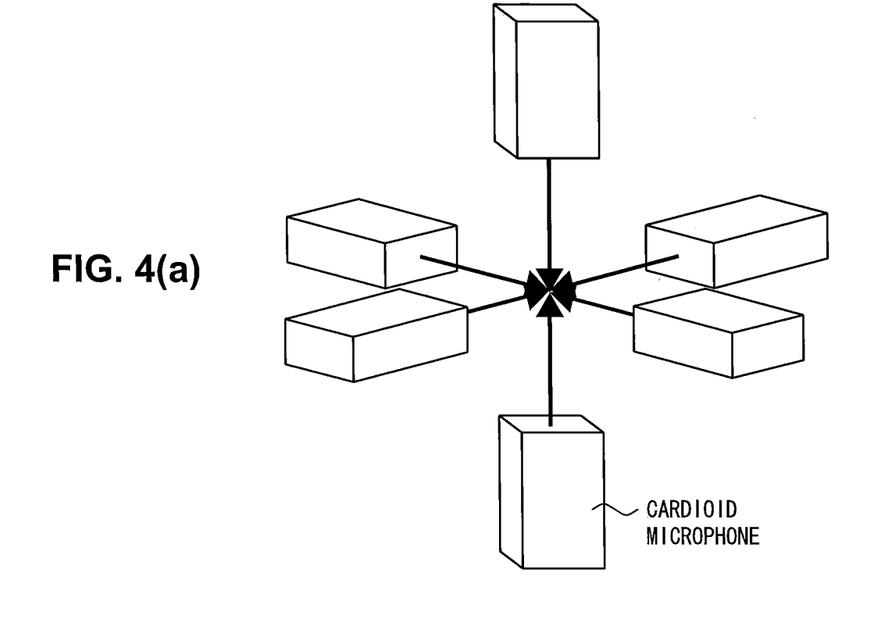
FIG. 4 is a diagram illustrating the configuration of a sound receiving unit of the acoustic energy measurement device according to the present invention.
Figure 4B:
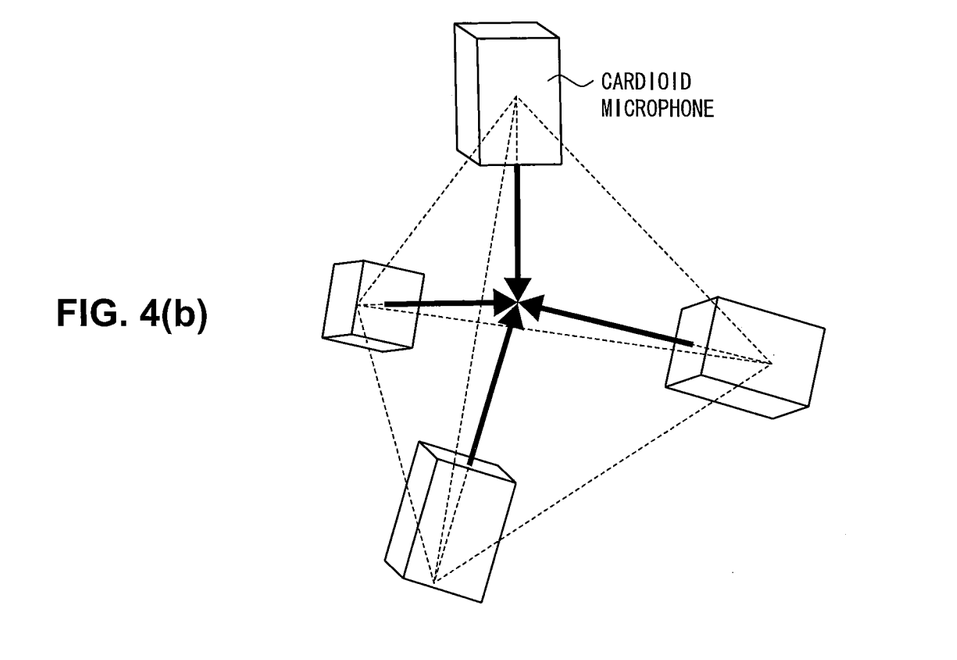

Here, the results of actual measurement of acoustic energy are described particularly: the measurement uses a C-C type cardioid microphone probe as the sound receiving unit. The measurement is conducted using the following probes as sound receiving units: a three-dimensional C-C probe shown in FIG. 4(*a*) of a 6-channel structure that uses three pairs of cardioid microphones disposed at 180 degrees in opposite directions in terms of directivity on each axis of Cartesian coordinates; a regular-tetrahedron C-C probe shown in FIG. 4(*b*) of a 4-channel structure that uses four cardioid microphones that lie from the vertexes of the regular tetrahedron toward the center of gravity. The conditions for the measurement are as follows:

Measured sound field: rectangular reverberation chamber (5 m wide×4 m in depth×3 m high)

Measured physical quantities: sound pressure, particle velocity and acoustic energy; additionally, sound pressure is also measured by a non-directional microphone for comparison Measured pattern: on a horizontal surface that is at a height of 1.5 m, measurement takes place at intersection points, spaced 1 m apart, of a matrix; measurement takes place at five points at different heights Measured items: impulse response and pure sound (80 Hz, 125 Hz)

Figure 5:
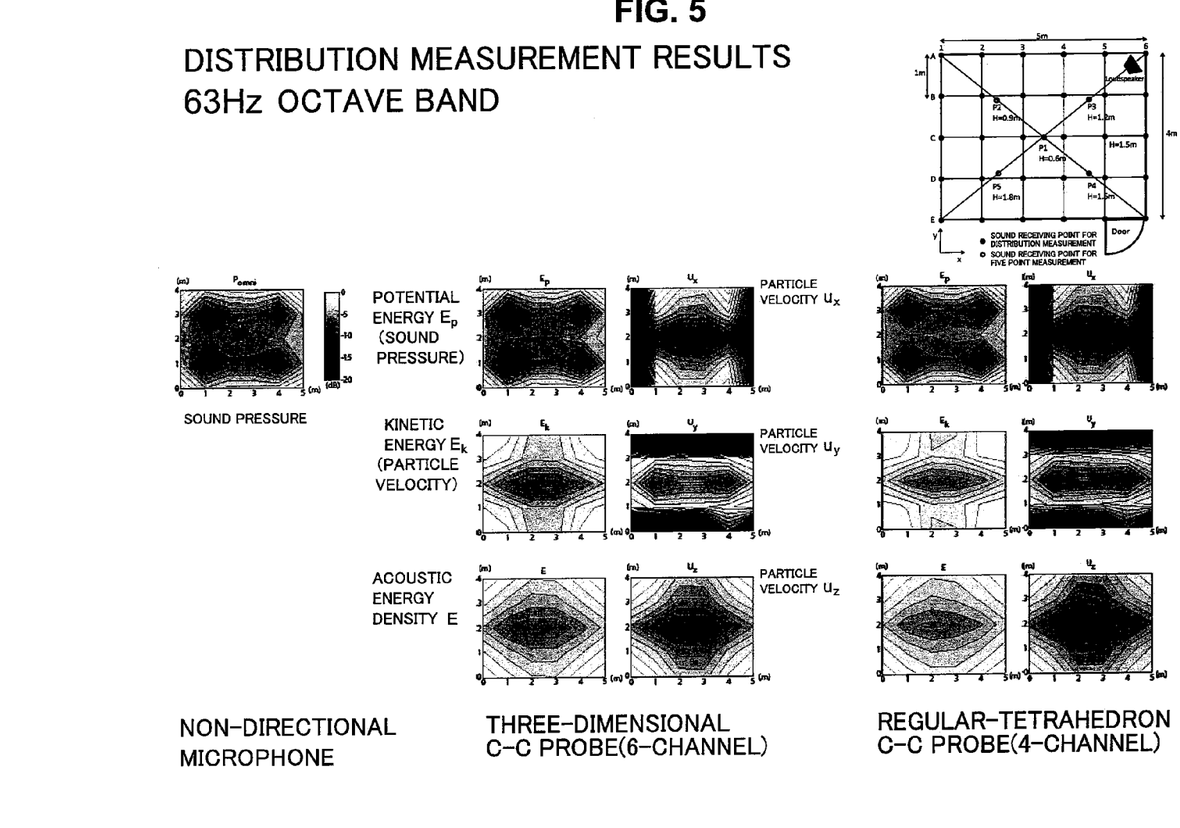
FIG. 5 shows the distribution measurement results of the 63 Hz octave band.
Figure 6:
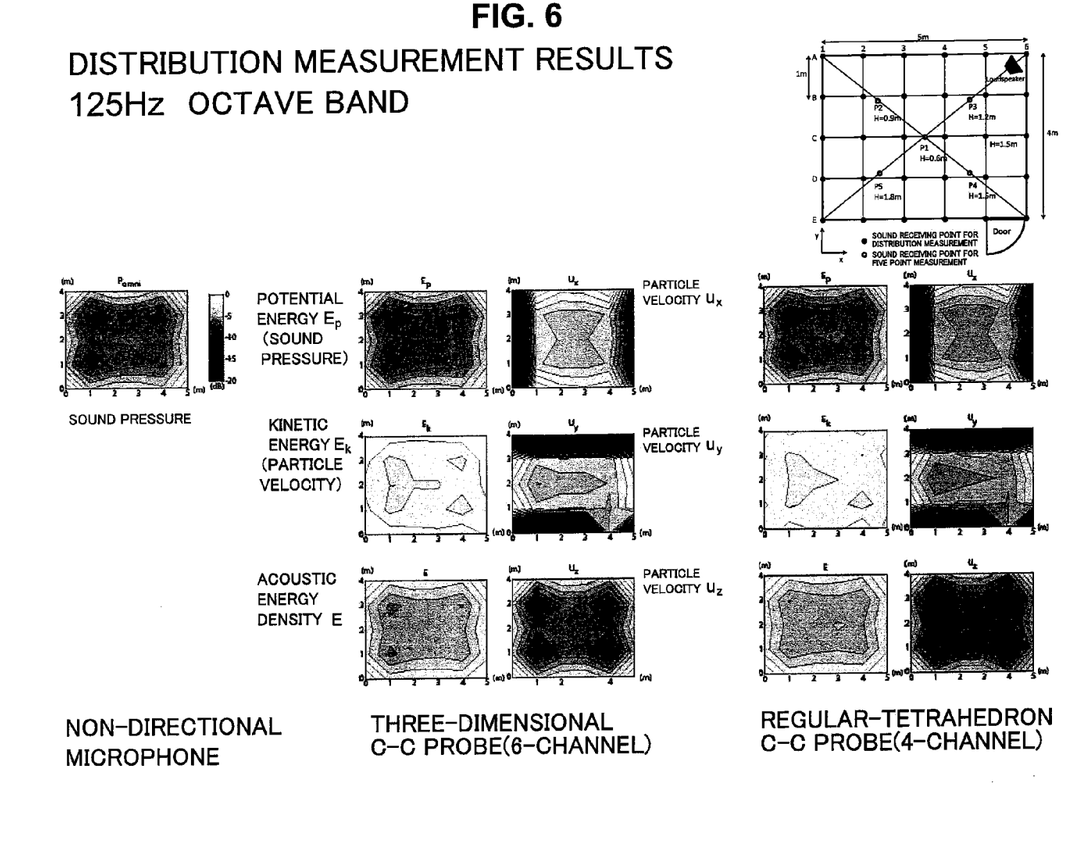
FIG. 6 shows the distribution measurement results of the 125 Hz octave band.
Figure 7:
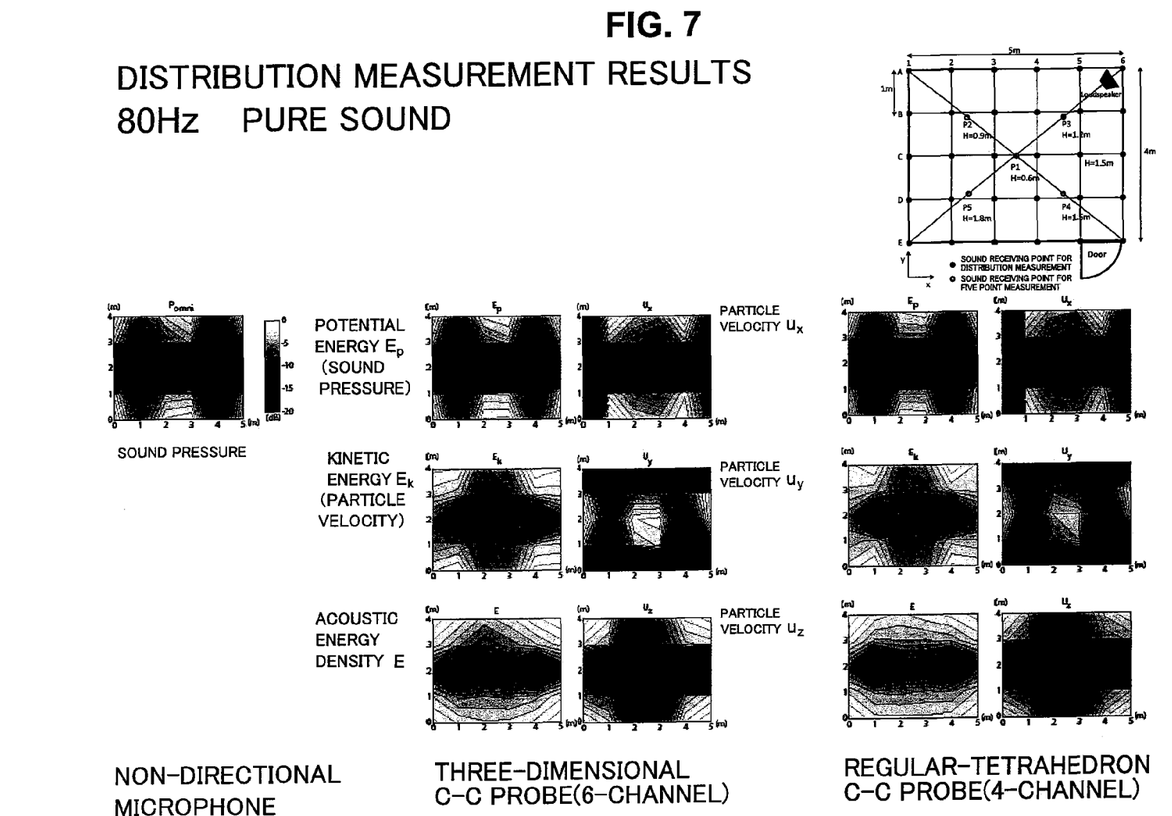
FIG. 7 shows the distribution measurement results of the 80 Hz pure sound.
Figure 8:
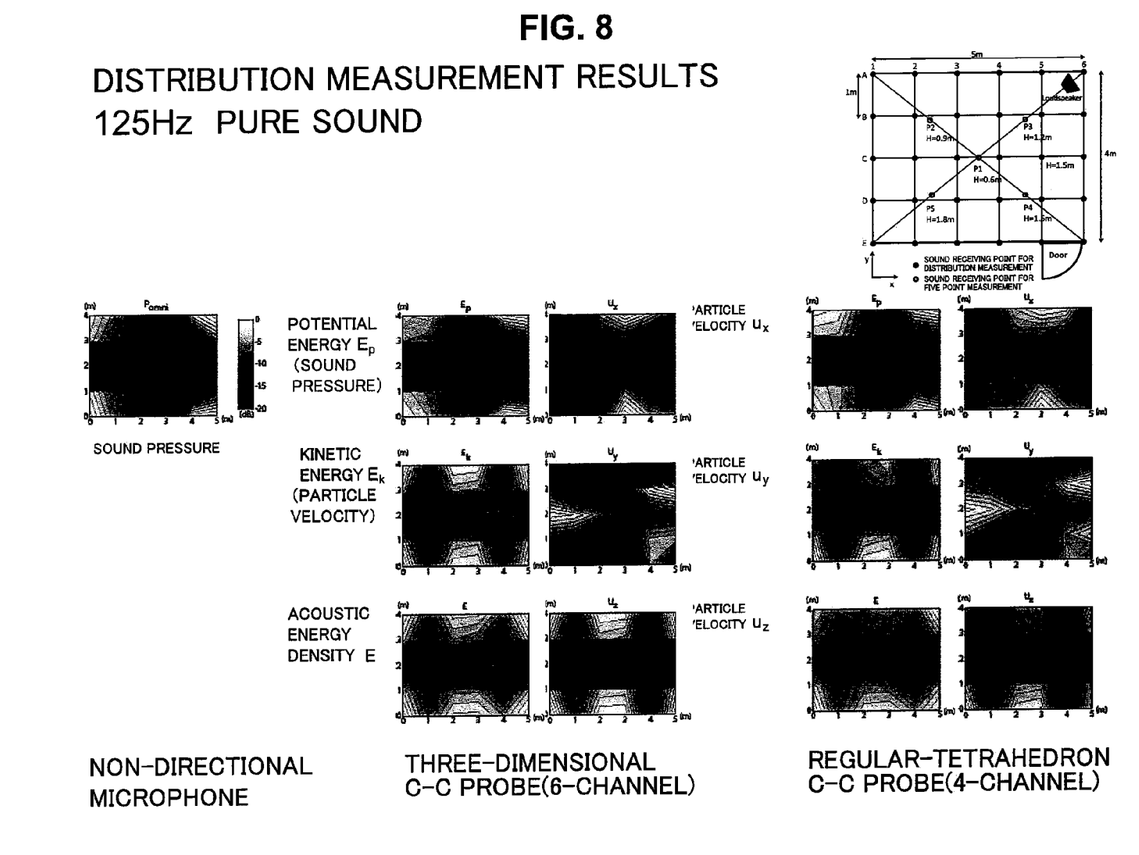
FIG. 8 shows the distribution measurement results of the 125 Hz pure sound.

As the measurement results, the results of distribution measurement are shown. FIG. 5 shows the distribution measurement results of the 63 Hz octave band. FIG. 6 shows the distribution measurement results of the 125 Hz octave band. FIG. 7 shows the distribution measurement results of the 80 Hz pure sound. FIG. 8 shows the distribution measurement results of the 125 Hz pure sound. In the diagrams, $P_{omni}$ represents the potential energy associated with the non-directional microphones, $E_p$ the potential energy associated with the 6- or 4-channel combined sound pressure P, $E_k$ the kinetic energy, E the acoustic energy density, $u_x$, $u_y$, and $u_z$ the results of the components of particle velocity vector. Additionally, the distributions have been normalized by maximum values. However, only the particle velocity vectors have been normalized by a common maximum value for all data items of $u_x$, $u_y$ and $u_z$.

It is clear from the diagrams that regular peaks and valleys, which are unique to modes, appear in the space distributions. It is also clear that a spatial deviation is larger in the pure-sound distributions than in the octave bands. Next, when the distributions of $P_{omni}$ and $E_p$ are compared, substantially similar distributions appear; it is clear from the result that if the scalar addition is carried out for the responses of the 6- or 4-channel cardioid microphones as in Formula 5, it is possible to calculate sound pressure in a way that is on par with non-directional microphones. Look at $E_k$: $E_k$ shows a different distribution than $E_p$. In many cases, if not all, the valleys of $E_p$ correspond to the peaks of $E_k$, and vice versa. Thus, it is clear that compared with $E_p$ for which only sound pressure is taken into account, the special deviation of the acoustic energy density E obtained by adding both tends to decrease. Take a look at the distributions of $u_x$ and $u_y$ of the components x and y of particle velocity vector: it is clear that the measurement has succeeded in capturing the features of each component of particle velocity, including the fact that values are significantly down around the walls that each lie in an axial direction.

It is clear even from the above results that in a standing-wave sound field, the sound pressure and the particle velocity behave in significantly different ways. Accordingly, as in the case of a conventional technique, to observe such a sound field only using sound pressure to look at a certain aspect of the sound field; with only the above method, it is impossible to evaluate the sound field.

Figure 9:
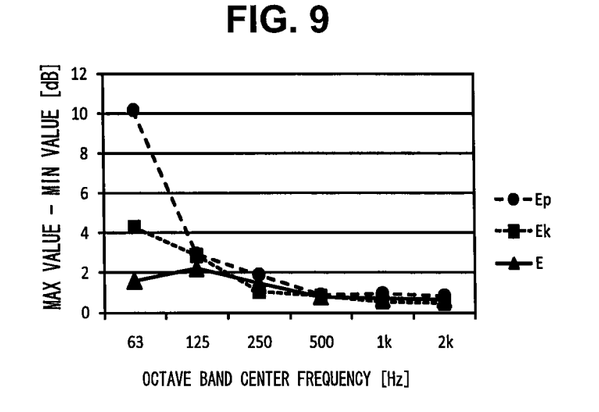
FIG. 9 is a graph showing the spatial deviations of energy at each sound receiving point.

Then, the results of the 5-point measurement with different heights will be shown. FIG. 9 is a graph showing the spatial deviations (differences between maximum and minimum values) of $E_p$, $E_k$ and E at each of five sound receiving points, P1 to P5. Each of the five sound receiving points P1 to P5 is the same in the measurement environment shown in FIG. 5 or the like. It is clear from the diagram that the deviations of $E_p$ and $E_k$ are large in the 63 Hz band that is considered to be significantly affected by the effects of mode while the spatial deviation decreases in a high frequency range. However, as for the acoustic energy density E, it is clear that the deviation remains small regardless of the frequency. More specifically, in the 63 Hz band, the deviation of $E_p$ is the largest at about 10 dB; $E_k$ is about 4 dB. However, the deviation of E is less than or equal to 2 dB. In a frequency band that is higher than the 125 Hz band, the spatial deviations of $E_p$, $E_k$ and E are substantially at the same level.

Figure 10:
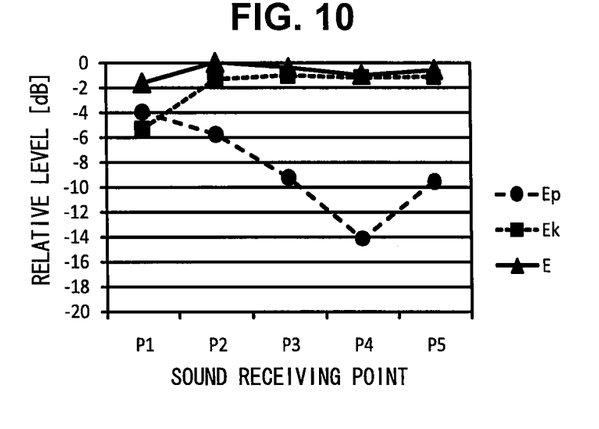
FIG. 10 is a graph showing the relative levels of energy at each sound receiving point in the 63 Hz octave band.
Figure 11:
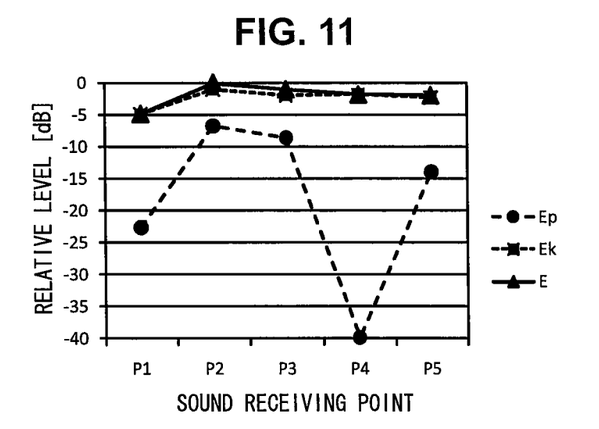
FIG. 11 is a graph showing the relative levels of energy at each sound receiving point in the 80 Hz pure sound.

The following describes the relative levels of $E_p$, $E_k$ and E at each of the sound receiving points P1 to P5. FIG. 10 shows the relative levels of $E_p$, $E_k$ and E at each of the sound receiving points P1 to P5 in the 63 Hz octave band. FIG. 11 shows the relative levels of $E_p$, $E_k$ and E at each of the sound receiving points P1 to P5 in the 80 Hz pure sound. Additionally, the relative levels are levels that are normalized by maximum values in $E_p$, $E_k$ and E. Each of the five sound receiving points P1 to P5 is the same in the measurement environment shown in FIG. 5 or the like. It is clear from the diagrams that $E_p$ changes most dramatically, particularly in the 80 Hz pure sound where the change of $E_p$ is greater than or equal to 30 dB. Meanwhile, it is clear that the deviation of $E_k$ is small and that the deviation of E is smaller and stable. Additionally, it is clear that in the standing-wave sound field, $E_k$ is generally at a higher level than $E_p$.

Figure 12:
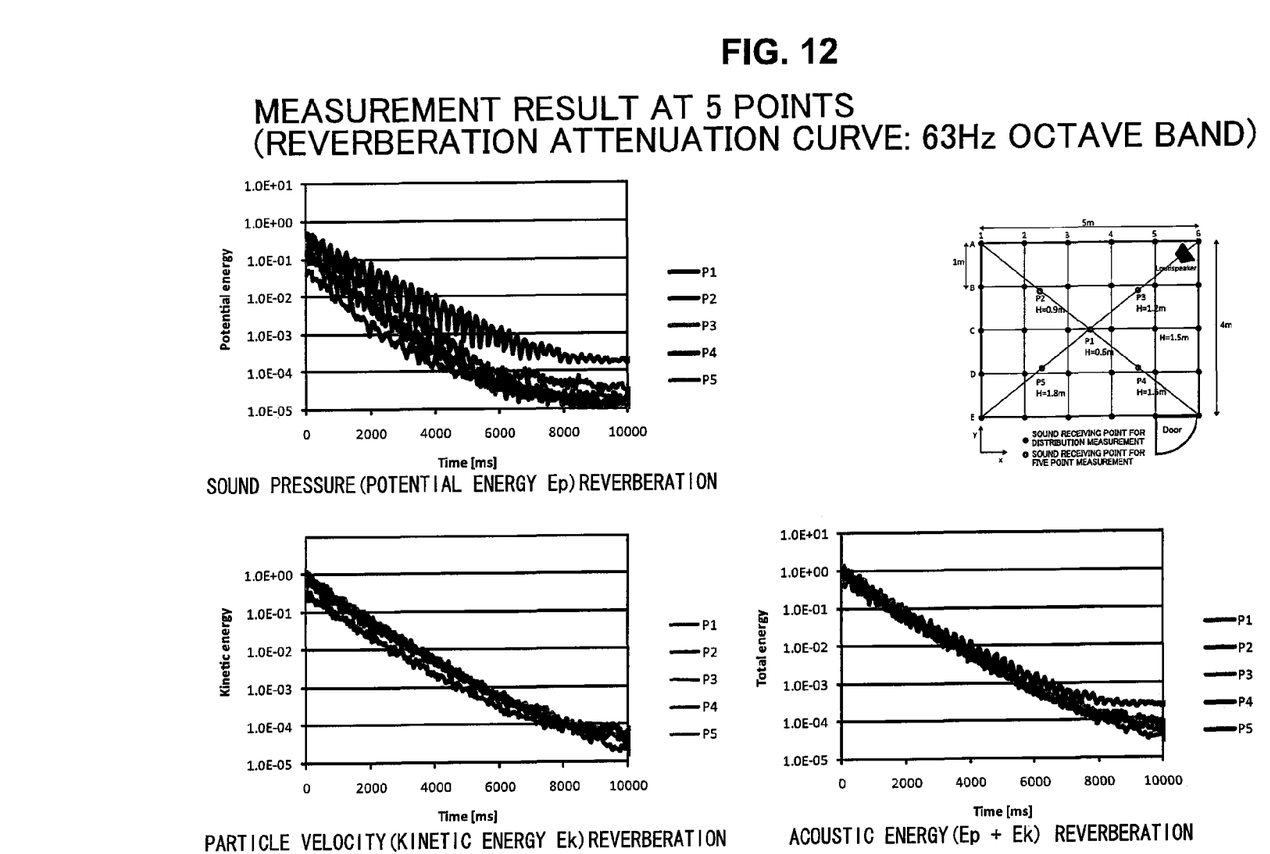
FIG. 12 is a graph showing reverberation attenuation characteristics at each sound receiving point in the 63 Hz octave band.

Furthermore, the reverberation deviations of $E_p$, $E_k$ and E at each of the five sound receiving points will be described. FIG. 12 is a graph showing the reverberation attenuation characteristics of $E_p$, $E_k$ and E at each of the sound receiving points. Additionally, the results are for the 63 Hz octave band. As shown in the diagram, as for the reverberation attenuation characteristics, it is clear that $E_p$ varies dramatically according to where the measurement takes place. Meanwhile, it is clear that E remains almost unchanged.

It is clear from the results of the actual measurement as described above that in the standing-wave sound field such as a low frequency range in a small space, the sound pressure changes particularly widely and that the deviation of $E_p$ is large. It is also clear that the special distributions of $E_p$ and $E_k$ are significantly different. Meanwhile, it is clear that the deviation of E is low and is not highly frequency-dependent. It is obvious that since $E_k$ is generally larger than $E_p$ in the standing-wave sound field, what is important is to observe not only $E_p$ but also $E_k$ as well in evaluating the sound field. In that manner, it is made clear as a result of the actual measurement that the acoustic energy E is not affected by the effects of the standing wave.

As described above, it is possible for the acoustic energy measurement device of the present invention to measure acoustic energy without being affected by the effects of standing waves.

With the use of the acoustic energy measurement device of the present invention having such features, an acoustic performance evaluation device may be realized. That is, the acoustic performance evaluation device of the present invention is designed to use the acoustic energy measured by the above acoustic energy measurement device as an acoustic evaluation indicator; the acoustic performance evaluation device measures acoustic energy using the acoustic energy measurement device in an enclosed space such as a room of a building, vehicle or airplane and uses the measured acoustic energy as an acoustic evaluation indicator to evaluate acoustic performance. For the evaluation, the logarithm of the acoustic energy may be stated in decibel, or other methods may be employed. A stage-evaluation process, in which the acoustic performance is classified into a plurality of levels, or another evaluation process is also available. Therefore, it is possible to realize the acoustic performance evaluation device that makes the objective acoustic evaluation possible without being affected by the effects of standing waves.

Figure 13:
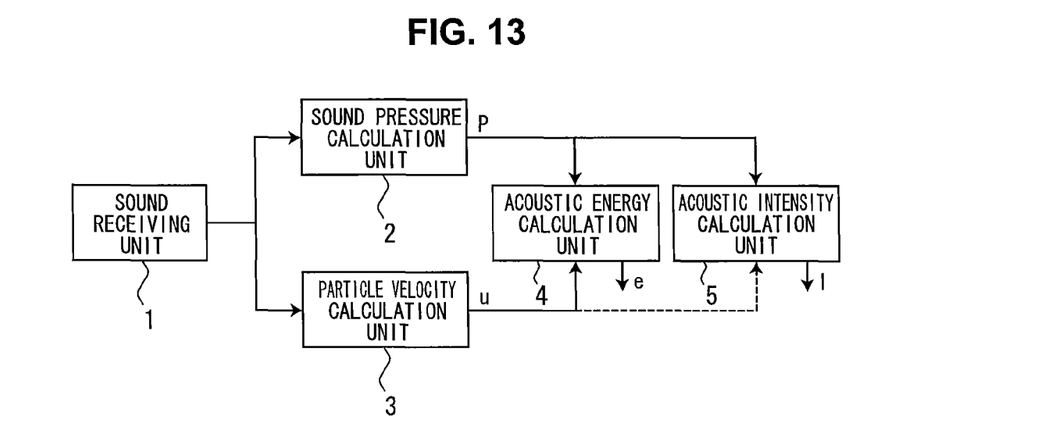
FIG. 13 is a block diagram illustrating an acoustic information measurement device of the present invention.

The following describes an acoustic information measurement device of the present invention that uses the above acoustic energy measurement device. FIG. 13 is a block diagram illustrating the acoustic information measurement device of the present invention. In the diagram, the same reference numerals as those in FIG. 13 denote the same parts as those in FIG. 1 and therefore will not described. As shown in the diagram, the acoustic information measurement device of the present invention mainly includes a sound receiving unit 1, a sound pressure calculation unit 2, a particle velocity calculation unit 3, an acoustic energy calculation unit 4 and an acoustic intensity calculation unit 5. That is, since the acoustic information measurement device of the present invention is made by adding the acoustic intensity calculation unit 5 to the above acoustic energy measurement device, it is possible to calculate acoustic intensity as well as acoustic energy.

Additionally, the acoustic intensity contains not only information about loudness of sound, frequency and waveform but also information about directions of sound; the acoustic intensity is physical quantity and is widely adopted in abroad range of fields such as noise identification or surveillance camera systems.

The acoustic intensity calculation unit 5 is designed to calculate acoustic intensity using the outputs from the sound pressure calculation unit 2 and the particle velocity calculation unit 3. More specifically, the acoustic intensity calculation unit 5 is designed to calculate acoustic intensity using the sound pressure output from the sound pressure calculation unit 2 and the particle velocity output from the particle velocity calculation unit 3.

In this case, the acoustic intensity is information about vector quantity given by the product of the sound pressure P, which is represented by scalar quantity, and the particle velocity u, which is represented by vector quantity. That is, the acoustic intensity is given by the following formula:

$$I(t)=P(t)u(t) \quad \text{[Formula 15]}$$

In the acoustic information measurement device of the present invention, if an array of a plurality of non-directional microphones is used for the sound receiving unit 1 as illustrated in the above Example 1, the sound pressure that the sound pressure calculation unit 2 calculates using the outputs of the non-directional microphones and the particle velocity that the particle velocity calculation unit 3 calculates from a sound-pressure difference are multiplied together in the acoustic intensity calculation unit 5. In this manner, the acoustic intensity is calculated. When two hot wires are used for calculating particle velocity as in the above Example 2, the acoustic intensity is calculated with the use of the particle velocity that the particle velocity calculation unit 3 calculates from changes in the resistance values of the two hot wires.

Furthermore, in the acoustic information measurement device of the present invention, when a pair of unidirectional microphones is used for the sound receiving unit 1 as in the above Example 3, the use of Formulas 5 and 7 makes it possible to represent Formula 15 as follows:

$$\begin{aligned}I(t) &= P(t)u(t) \quad \text{[Formula 16]}\\ &= -\{P_1(t)+P_2(t)\}\{P_1(t)-P_2(t)\}/\rho c \\ &= -\{P_1^2(t)-P_2^2(t)\}/\rho c\end{aligned}$$

Accordingly, in this case, the following is possible: the acoustic intensity calculation unit 5 makes the sound pressure calculation unit 2 output the unidirectional sound pressure of each microphone on the basis of the outputs from a pair of the unidirectional microphones, performs addition and subtraction only using those two unidirectional sound pressure, and calculates the acoustic intensity by multiplying the results together. It is also clear from Formula 16 that it is possible to calculate the acoustic intensity by squaring each unidirectional pressure and subtracting with each other. In such a case, for the acoustic intensity to be calculated, only the unidirectional sound pressure information from the sound pressure calculation unit may be used; the output from the particle velocity calculation unit may not be used.

In the acoustic information measurement device of the present invention, when a vector combination method, such as the one described in the above Example 4, is used, the use of Formulas 8 and 9 makes it possible to represent Formula 15 as follows:

$$\vec{I}(t) = -\frac{2K}{n}\cdot\frac{1}{\rho c}\sum_{i=1}^{n} P_i(t)\times\sum_{i=1}^{n}\{P_i(t)\cdot\vec{e}_i\} \quad \text{[Formula 17]}$$

where, in the above formula, n represents the number of microphones (the number of channels) and K is a coefficient for particle velocity normalization which varies according to the number of channels or the type of microphones.

It is clear from the above formulas that when the sound field is interpreted by vectors as in the above Example 4, all that is required in the acoustic intensity calculation unit is to multiply the particle velocity vector and the non-directional sound pressure together in order to calculate the acoustic intensity.

When the sound pressure squared, i.e., the square of the sound pressure, is taken into account, acoustic intensity I(t) is represented by the following formula:

$$\vec{I}(t) = -\frac{G}{n}\cdot\frac{1}{\rho c}\sum_{i=1}^{n}\{P_i^2(t)\cdot\vec{e}_i\} \quad \text{[Formula 18]}$$

where G is a normalization coefficient that varies according to the number of channels or the type of microphones.

It is clear from the above formulas that when the sound field is interpreted by vectors as in the above Example 4 with the sound pressure squared being taken into account, it is possible to directly calculate the acoustic intensity without calculating the particle velocity vector. Thus, in this case, the acoustic intensity calculation unit 5 squares the sound pressure that is supplied from the sound pressure calculation unit 2 on the basis of the outputs from a pair of unidirectional microphones; multiplies the sound pressure squared by each unit vector; and combines the vectors to calculate the acoustic intensity. That is, in this case, for the calculation of the acoustic intensity, all that is required is to use only the output from the sound pressure calculation unit; the output from the particle velocity calculation unit may not be used.

As described above, according to the acoustic information measurement device of the present invention, while the basic configuration of the sound receiving unit and the like remains similar to those of the acoustic energy measurement device, it is possible to calculate not only acoustic energy but also acoustic intensity. For the acoustic intensity calculation, not only the configuration that employs only the sound pressure calculation unit of the acoustic energy measurement device but also the configuration that employs both the sound pressure calculation unit and the particle velocity calculation unit are possible.

With the use of the above acoustic information measurement device of the present invention, an acoustic performance evaluation device may be realized. That is, the acoustic performance evaluation device of the present invention can use the acoustic energy or acoustic intensity measured by the above acoustic energy measurement device as an acoustic evaluation indicator, thereby making it possible to evaluate acoustic performance on the basis of much more information.

Figure 14:
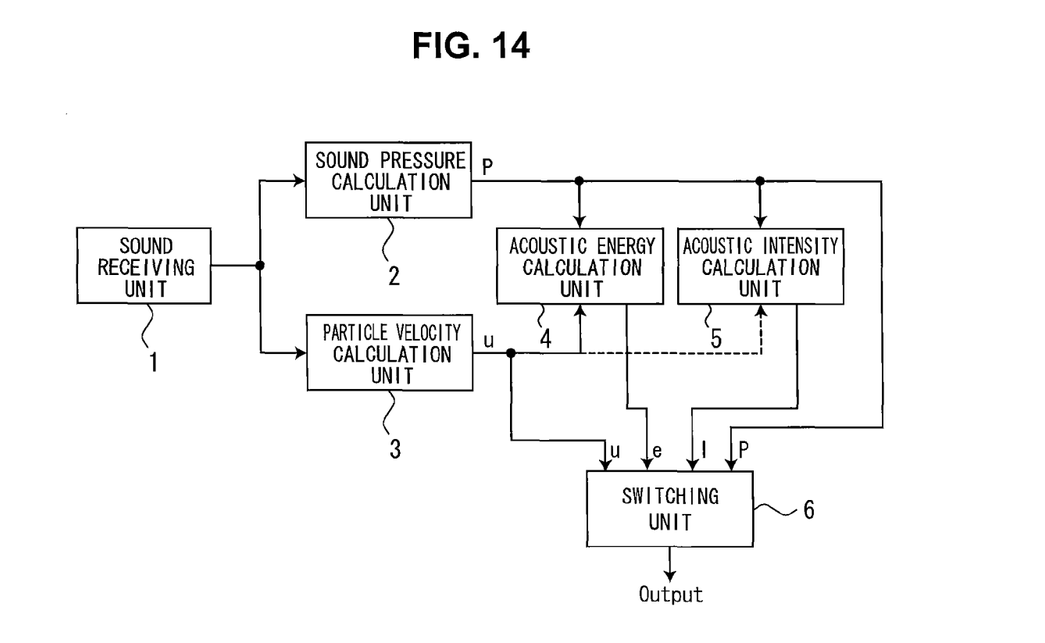
FIG. 14 is a block diagram illustrating another example of the acoustic information measurement device of the present invention.

The following describes another example of the above acoustic information measurement device. FIG. 14 is a block diagram illustrating another example of the acoustic information measurement device of the present invention. In the diagram, the same reference numerals as those in FIG. 14 denote the same parts as those in FIG. 13 and therefore will not described. As shown in the diagram, the acoustic information measurement device of the present invention mainly includes a sound receiving unit 1, a sound pressure calculation unit 2, a particle velocity calculation unit 3, an acoustic energy calculation unit 4, an acoustic intensity calculation unit 5 and a switching unit 6. That is, the acoustic information measurement device of the present invention is so formed as to enable sound pressure information, particle velocity information, acoustic energy information or acoustic intensity information to be output with the use of the switching unit.

The switching unit 6 selectively switches between the sound pressure P by the sound pressure calculation unit 2, the particle velocity u by the particle velocity calculation unit 3, the acoustic energy e by the acoustic energy calculation unit 4, and the acoustic intensity I by the acoustic intensity calculation unit 5 as an output of the acoustic information measurement device. Additionally, in the example illustrated in the diagram, the switching unit 6 is so formed as to switch between all pieces of acoustic information (P, u, e and I). However, the present invention is not limited to this. What is also available is the one that can switch between at least two or more of the pieces of acoustic information to output. Needless to say, the switching unit may display a list of all the pieces of acoustic information.

According to the acoustic information measurement device of the present invention, particularly when the one that employs a C-C system, such as the one described in the above Example 3 or 4, is used, if unidirectional pressure $P_i$ is calculated from the output from the sound receiving unit 1, it is possible to obtain, with the use of the unidirectional pressure $P_i$, particle velocity u, acoustic energy e and acoustic intensity I only by performing a calculation process. Therefore, it is possible to calculate all the kinds of acoustic information through one measurement process. The acoustic information measurement device of the present invention is so formed as to selectively output the calculated information with the use of the switching unit 6. As described above, for the one that employs the C-C system, it is also possible to calculate non-directional sound pressure; the use of the vector combination method also enables particle velocity vectors to be calculated.

For example, when such an acoustic information measurement device is made as a portable measurement device, it is possible and easy to selectively output a plurality of pieces of acoustic information only by switching a switch or the like that constitutes the switching unit at a measurement site. Thus, the acoustic information measurement device of the present invention is a device that can replace sound level meters that have been so far used in the sound pressure performance evaluation.

Additionally, the acoustic energy measurement device, acoustic performance evaluation device, acoustic information measurement device of the present invention are not limited to the examples illustrated in the above diagrams, but it is a matter of course that modifications may be made without departing from the spirit of the present invention.

EXPLANATION OF REFERENCE SYMBOLS

1: Sound receiving unit
2: Sound pressure calculation unit
3: Particle velocity calculation unit
4: Acoustic energy calculation unit
5: Acoustic intensity calculation unit
6: Output switching unit
41: Potential energy calculation unit
42: Kinetic energy calculation unit
43: Adder

The invention claimed is:

1. An acoustic energy measurement device that measures acoustic energy, the acoustic energy measurement device comprising:
   a C-C type acoustic energy measurement device comprising:
   a sound receiving unit that performs sound/electricity conversion and includes a plurality of unidirectional microphones being so disposed that a sum total of unit vectors facing a maximum sensitivity direction thereof becomes zero;
   a sound pressure calculation unit that calculates non-directional sound pressure which is a sum total of sound pressure of the plurality of unidirectional microphones using an output from the sound receiving unit;
   a particle velocity calculation unit that calculates particle velocity which is a combination of vectors after each unit vector is multiplied by the sound pressure of each of the plurality of unidirectional microphones using an output from the sound receiving unit; and
   an acoustic energy calculation unit that calculates acoustic energy using outputs from the sound pressure calculation unit and the particle velocity calculation unit.

2. The acoustic energy measurement device according to claim 1, in which the acoustic energy calculation unit adds together potential energy that is calculated with the use of an output from the sound pressure calculation unit and kinetic energy that is calculated with the use of an output from the particle velocity calculation unit to calculate acoustic energy.

3. The acoustic energy measurement device according to claim 1, in which the sound receiving unit includes a characteristic correction unit that corrects a characteristic of information measured by the sound receiving unit.

4. An acoustic performance evaluation device that produces an acoustic evaluation indicator on the basis of acoustic energy measured by an acoustic energy measurement device that measures acoustic energy, the acoustic energy measurement device comprising:
   a C-C type acoustic energy measurement device comprising:
   a sound receiving unit that performs sound/electricity conversion and includes a plurality of unidirectional microphones being so disposed that a sum total of unit vectors facing a maximum sensitivity direction thereof becomes zero;
   a sound pressure calculation unit that calculates non-directional sound pressure which is a sum total of sound pressure of the plurality of unidirectional microphones using an output from the sound receiving unit;
   a particle velocity calculation unit that calculates particle velocity which is a combination of vectors after each unit vector is multiplied by the sound pressure of each of the plurality of unidirectional microphones using an output from the sound receiving unit; and
   an acoustic energy calculation unit that calculates acoustic energy using outputs from the sound pressure calculation unit and the particle velocity calculation unit.

5. The acoustic energy measurement device according to claim 4, in which the acoustic energy calculation unit adds together potential energy that is calculated with the use of an output from the sound pressure calculation unit and kinetic energy that is calculated with the use of an output from the particle velocity calculation unit to calculate acoustic energy.

6. The acoustic energy measurement device according to claim 4, in which the sound receiving unit includes a characteristic correction unit that corrects a characteristic of information measured by the sound receiving unit.

7. The acoustic energy measurement device according to claim 1, wherein the particle velocity is calculated relying upon acoustic impedance.

8. The acoustic energy measurement device according to claim 4, wherein the particle velocity is calculated relying upon acoustic impedance.

* * * * *

UNITED STATES PATENT AND TRADEMARK OFFICE
CERTIFICATE OF CORRECTION

| | |
|---|---|
| PATENT NO. | : 8,798,955 B2 |
| APPLICATION NO. | : 13/000350 |
| DATED | : August 5, 2014 |
| INVENTOR(S) | : Toshiki Hanyu |

It is certified that error appears in the above-identified patent and that said Letters Patent is hereby corrected as shown below:

Title Page (56) On page 2, under Other Publications heading – Replace
"NUTTER DAVID B., LEISHMAN TIMOTHY W., SOMEMRFELDT SCOTT D., BLOTTER JONATHAN D., "Measurment of sound power" with
--NUTTER DAVID B., LEISHMAN TIMOTHY W., SOMMERFELDT SCOTT D., BLOTTER JONATHAN D., "Measurement of sound power--

Drawings

Drawing Sheet 6 of 9, FIG. 8 – Replace "ARTICLE ELOCITY $U_x$" with
--PARTICLE VELOCITY $U_x$--

Drawing Sheet 6 of 9, FIG. 8 – Replace "ARTICLE ELOCITY $U_y$" with
--PARTICLE VELOCITY $U_y$--

Drawing Sheet 6 of 9, FIG. 8 – Replace "ARTICLE ELOCITY $U_z$" with
--PARTICLE VELOCITY $U_z$--

Specification

Column 11, line 11 – Replace "the special deviation of the acoustic" with
--the spatial deviation of the acoustic--

Column 12, lines 57-58 – Replace "adopted in abroad range of fields" with
-- adopted in a broad range of fields--

Column 14, line 52-53 – Replace "will not described." with
--will not be described.--

Signed and Sealed this
First Day of March, 2016

Michelle K. Lee
*Director of the United States Patent and Trademark Office*